United States Patent
Krebsbach et al.

[15] 3,635,639
[45] Jan. 18, 1972

[54] HEATING APPARATUS FOR PRODUCING FORM CONFIGURATIONS IN TUBULAR PIECES

[72] Inventors: Friedhelm Krebsbach, Troisdorf; Gerhard Osterhagen, Driesch near Eitorf; Gunter Oettel, Siegburg, all of Germany

[73] Assignee: Dynamit Nobel Aktiengesellschaft, Germany

[22] Filed: Dec. 24, 1968

[21] Appl. No.: 786,701

[30] Foreign Application Priority Data

Dec. 20, 1967 Germany .................... P 17 04 011.8

[52] U.S. Cl. .................... 425/384, 165/65, 165/14, 425/392
[51] Int. Cl. .................................................. B29b 3/00
[58] Field of Search ...... 18/19 TE, 19 TM, DIG. 14, DIG. 18, 18/DIG. 41, DIG. 53, DIG. 58; 165/30, 58, 14, 61, 65; 264/DIG. 46

[56] References Cited

UNITED STATES PATENTS

| | | | |
|---|---|---|---|
| 2,249,004 | 7/1941 | Kahn et al. | 18/19 TM |
| 2,390,266 | 12/1945 | Novatny | 264/DIG. 46 |
| 3,042,965 | 7/1962 | Gray, Jr. et al. | 18/19 TE X |
| 3,196,198 | 7/1965 | Rex | 165/61 X |
| 3,370,112 | 2/1968 | Wray | 18/19 TM |

*Primary Examiner*—Robert L. Spicer, Jr.
*Attorney*—Craig, Antonelli and Hill

[57] ABSTRACT

The present disclosure is directed to a process and a heating apparatus for permitting the production of crimped, compressed, and beaded sections in tubular pieces made of a synthetic material which comprises a means adapted to receive a tubular piece, said means provided with a heating means for selectively heating a portion of said tubular pieces and cooling means associated with at least one of the marginal areas surrounding said heated portion thereby preventing distortion of the tubular pieces in said marginal areas.

20 Claims, 5 Drawing Figures

INVENTORS
FRIEDHELM KREBSBACH
GERHARD OSTERHAGEN
GÜNTER OETTEL

BY *Craig & Antonelli*
ATTORNEYS

INVENTORS
FRIEDHELM KREBSBACH
GERHARD OSTERHAGEN
GÜNTER OETTEL

BY *Craig & Antonelli*

ATTORNEYS

HEATING APPARATUS FOR PRODUCING FORM CONFIGURATIONS IN TUBULAR PIECES

BACKGROUND OF THE INVENTION

The present invention relates to a process for forming cordlike or tubular synthetic pieces wherein the section to be subjected to the forming step is locally heated. The present invention is also directed to an apparatus for conducting the aforementioned process wherein the heating step is carried out by means of a heatable block which is adapted to receive the surface of the synthetic piece to be heated, or by means of a medium exerting its influence on this surface.

Synthetic pipes or cords are often utilized in order to make it possible to provide seals or similar structures with beads or flanges extending therearound, including crimps or compressed areas. In order to be able to form the material in a suitable manner, it is locally heated at the appropriate places, either by emersing the material in a liquid bath having a corresponding temperature, or by providing a flow of hot air around the material. Another process resides in bringing the section to be heated into intimate contact with a heated metal block, thereby bringing the section to the required temperature very quickly.

In these forming processes, it often happens that portions of the workpiece are heated which are not subjected to a subsequent forming step. This unnecessary heating often causes changes in shape by warping or shrinking and frequently results in the formation of cracks.

SUMMARY OF THE INVENTION

An object of the present invention is to avoid the prior art disadvantages in the production of crimped, compressed and beaded sections in tubular pieces made of a synthetic material.

Another object of the present invention is to provide an improved process and apparatus for producing crimped, compressed, beaded, and similar type sections in tubular pieces of a synthetic material wherein changes in shape by warping or shrinking, and the formation of cracks due to unnecessary heating is substantially avoided.

Other objects in further scope of the applicability of the present invention will become apparent from the detailed description given hereinafter; it should be understood, however, that the detailed description is and specific examples, while indicating preferred embodiments of the invention, are given by way of illustration only, since various changes in modification within the spirit and scope of the invention will become apparent to those skilled in the art from this detailed description.

Pursuant to the present invention, it has been found that the above-mentioned disadvantages may be eliminated and a much improved process and apparatus for producing crimped, compressed, beaded sections, and the like, in tubular pieces may be obtained by limiting the effect of the heating to a predetermined zone by cooling at least one of the regions joining the section to be formed.

In order to carry out the process of the present invention, a heating apparatus is provided wherein the heating is conducted by means of a heatable block which contacts the surface area of the synthetic piece which is to be heated, or by means of a medium exerting its influence on this surface area, characterized in that cooling elements, preferably cooling chambers having a cooling medium flowing therethrough, are disposed in one or both of the marginal regions of the surface being heated. The cooling members which are provided with a surface made of a heat-conductive material, exert their influence on said regions.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
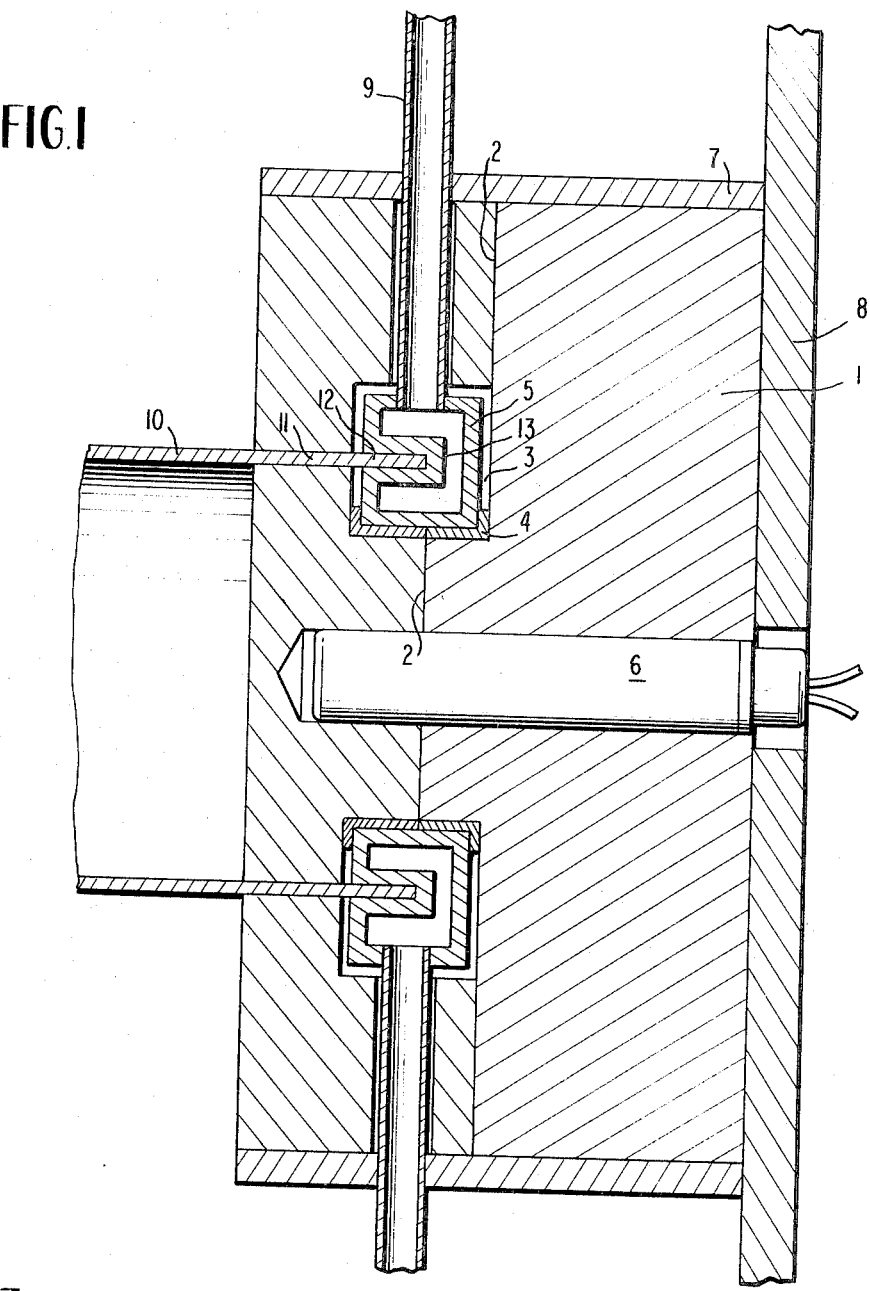
FIG. 1 shows the apparatus of the present invention used in a process for forming a pipe section disposed in the proximity of the end of a pipe.

In the apparatus of FIG. 1, the pipe 10 of synthetic material, which is provided with a bead extending therearound in the proximity of its right end, is heated at the appropriate spot by contact with a metal block 1 heated by a heating element 6. The metal block 1 exhibits a cylindrical shape, and the likewise cylindrical, electrical, heating element 6 extends along the cylinder axis of the block. A cooling ring 5, insulated with respect to the block by heat insulations 4, is inserted into the block. The block is subdivided, for assembly reasons, into various elements by means of parting lines 2. The cooling ring is dimensioned so that the end of the pipe 10 can be inserted therein in such a manner that the outer and inner portions of the pipe end are cooled. The cooling ring is furthermore provided with feedlines 9 for the cooling medium, said feedlines extending out of the block. The cooling ring 5 embedded in the annular chamber 3 of the block 1 is provided with an annular slot 12 which extends towards the feed side of the pipe 10, through which slot the pipe end can be pushed into the cooling ring. Also, the block 1 has an annular slot 11 at the appropriate place wherein the pipe, after being inserted, is heated. Within the cooling ring 5, a stop abutment 13 is provided said abutment limiting the extent in which the pipe is inserted into the block.

After the pipe 10 has been inserted into the annular slot 11 of the metal block and the annular slot 12 of the cooling ring, the pipe is heated along the length of the annular slot 11, whereas the pipe end disposed in the annular slot 12 is cooled. This prevents, among other things, the pipe end in the proximity of that portion of the pipe being heated, from widening and cracking due to the influence of the heating process.

Figure 2:
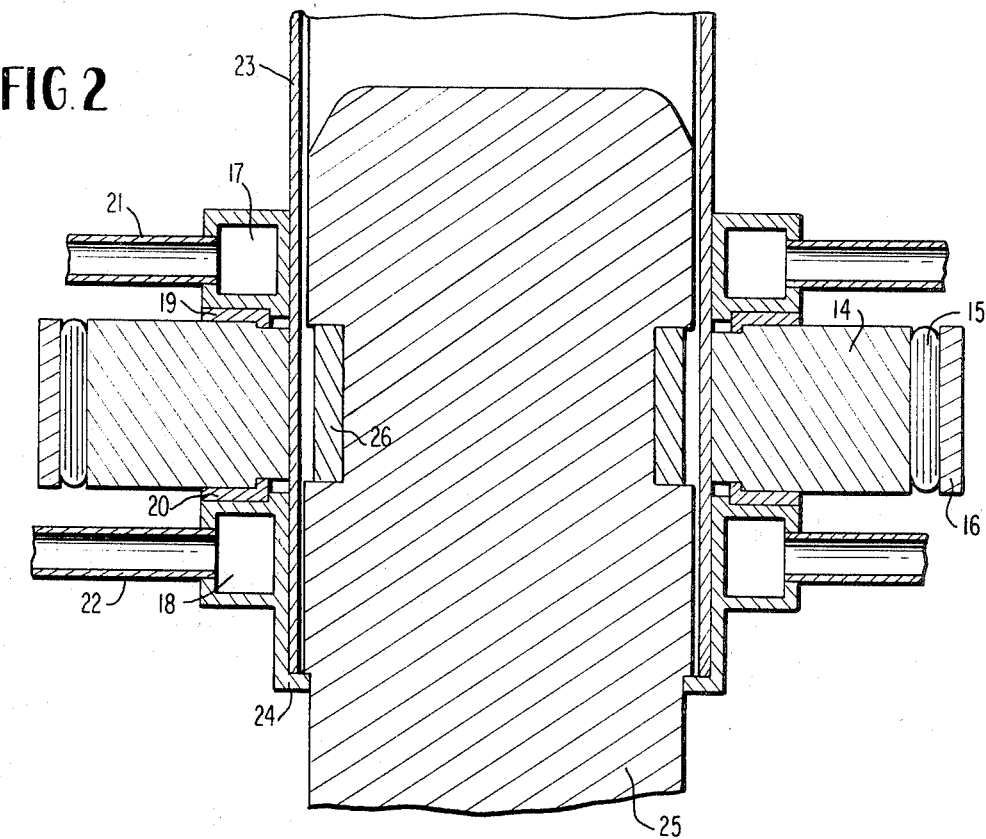
FIG. 2 shows the apparatus of the present invention used in a process for forming or shaping any desired portion of a pipe.

Another embodiment of the apparatus of the present invention is shown in FIG. 2. In this embodiment, the pipe 23 to be formed is pushed over a mandrel 25 and contacts the outer side of part of its length with a metallic ring 14 which surrounds the pipe. This metallic ring is heated by a heating duct 15 encompassing the ring, and, in turn, heats the pipe 23. The heating duct 15 is surrounded by an insulating means 16. In the direction of the axis of the pipe, annular chambers 17 and 18 are disposed on both sides of the metallic ring 14, said chambers being separated from the metallic ring by insulating means 19 and 20. The cooling medium flows through the bead lines 21 and 22 and is withdrawn therethrough. At the cooling ring 18, a stop 24 is provided for the pipe 23 and the mandrel 25, thus fixing the section of the pipe to be heated. At the point opposite to the heating metallic ring 14, but separated therefrom by the pipe wall, the mandrel 25 is provided with an annular heat insulating means 26.

As in the aforedescribed apparatus, the pipe is pushed in up to the stop, and thereby the appropriate sections are subjected to the heating and cooling steps. The stop 24 need not necessarily be affixed to a cooling ring and will generally be fashioned to be adjustable in order to be able to vary the point to be formed in the direction of the longitudinal axis of the pipe.

Figure 3:
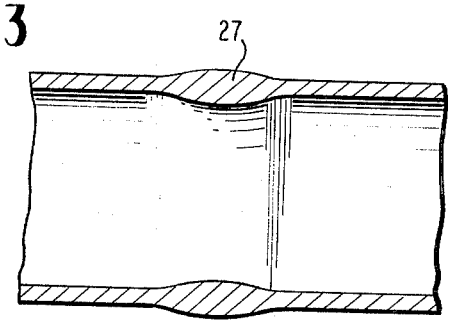
FIG. 3, 4, and 5 illustrate the various types of shapes which can be produced after treating the pipe section in the apparatus of the present invention.
Figure 4:
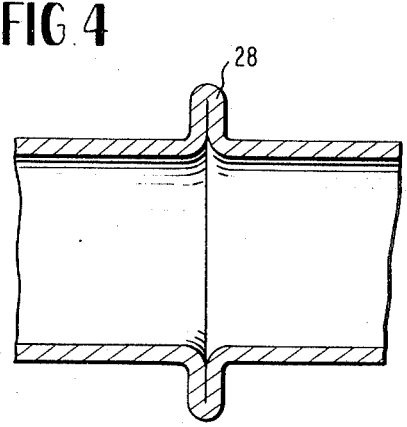
Figure 5:
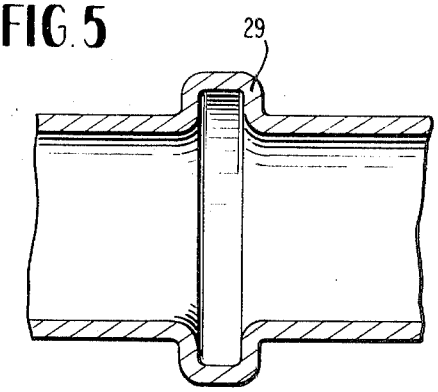

FIGS. 3 to 5 shows embodiments of formed configurations in particularly good quality, as they can be produced after the tubular pieces have been treated in accordance with the process and apparatus of the present invention. In this connection, reference numeral 27 denotes a compressed (thickened) section, reference numeral 28 denotes a crimped (folded) section and reference numeral 29 denotes a beaded section. The invention is not limited to the two illustrated embodiments, but rather a number of other configurations are possible wherein, for example, the cooling medium, which can be a gas or liquid, is brought into direct contact with the synthetic material to be cooled, or wherein heating is conducted in a different manner than described herein.

The synthetic materials which can be used to produce the tubular pieces of the present invention include vinyl resins, such as polyvinyl chloride, polyvinylidene chloride, polyvinyl acetate, polystyrene, acrylate resins such as polyacrylates, polymethyl, methacrylate and polyurethanes prepared by reacting such materials as polyesters, polyethers, polyester amides, castor oil and such low molecular weight alcohols as trimethylol-propane and glycerol with organic polyisocyanates including aromatic diisocyanates such as toluene diisocyanate and diphenylmethane diisocyanate and aliphatic diisocyanates such as hexylmethylene diisocyanate.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. A heating apparatus for permitting the production of formed configurations in tubular pieces made of a synthetic material which comprises a means adapted to receive a tubular piece, said means provided with a heating means for selectively heating a portion of said tubular piece and cooling means associated with at least one of the marginal areas surrounding said heated portion thereby preventing distortion of the tubular pieces in said marginal areas.

2. The apparatus of claim 1 wherein the means for receiving the tubular piece is a metallic block means and a cooling means which contains annular slots for receiving the tubular piece, the end portion of said tubular piece terminating in an annular core which is provided with said cooling means.

3. The apparatus of claim 2 wherein the cooling means is a cooling ring which is insulated from the metal block and provided with a stop abutment which determines the depth of insertion of the tubular pieces into the slots in the metal block and the cooling ring.

4. The apparatus of claim 3 wherein the heating means is axially disposed in the metal block with respect to the annular core.

5. The apparatus of claim 1 wherein the means adapted to receive a tubular piece is a metallic ring which surrounds said piece and a mandrel disposed on the inside of said tubular piece.

6. The apparatus of claim 5 wherein the heating means is a heating duct which is annularly disposed in the metallic ring.

7. The apparatus of claim 6 wherein the cooling means are cooling chambers which surround the tubular piece on at least one side of the metallic ring.

8. The apparatus of claim 7 wherein the cooling chambers are insulated from the metallic ring.

9. The apparatus of claim 8 wherein the mandrel is insulated from the inside of the tubular piece in the vicinity of the metallic ring.

10. A heating apparatus for permitting the production of formed configurations in tubular pieces made of a synthetic material, and in the proximity of the tubular end portion which comprises a metal block adapted to receive the end portion of a tubular piece, said end portion terminating in an annular core disposed in the metal block and containing a cooling ring, means for introducing a cooling medium into a channel in communication with the cooling ring and heating means axially disposed in the metal block with respect to the annular cores for heating said block, the end portion of said tubular piece being in contact with the cooling ring and the portion adjacent said end portion being in contact with the heated metallic block.

11. The apparatus of claim 10 wherein insulation means are provided in the annular core to insulate the cooling ring from the metal block.

12. The apparatus of claim 10 wherein the cooling ring is provided with a stop abutment which determines the depth of insertion of the tubular piece into the metal block.

13. The apparatus of claim 10 wherein the metal block and heating means are cylindrical in shape.

14. The apparatus of claim 10 wherein the metal block is subdivided, for assembly reasons, into a plurality of components.

15. The apparatus of claim 10 wherein the means for introducing a cooling medium are feed lines which extend through an annular slot in the metallic block from the cooling ring out of the metallic block.

16. A heating apparatus for permitting the production of formed configuration in tubular pieces made of a synthetic material and in a portion of a tubular length which comprises a mandrel surrounded by and spaced apart from a metallic ring and defining a channel therebetween, said channel adapted to receive a tubular piece, a heating means annularly disposed in the metallic ring for heating a portion of the tubular length and cooling means in contact with the tubular piece on at least one side of the metallic ring, thereby associating with at least one of the marginal areas surrounding said heated portion of the tubular piece thereby preventing distortion of the tubular piece in said marginal areas.

17. The apparatus of claim 16 wherein the cooling means are annular chambers which surround and contact tubular pieces and wherein means are provided for introducing the cooling medium into the annular chamber.

18. The apparatus of claim 16 wherein stop abutment means are provided in the channel for fixing the section of the tubular piece to be treated.

19. The apparatus of claim 16 wherein insulation means are provided between the cooling means and the metallic ring.

20. The apparatus of claim 16 wherein insulation means are provided for the mandrel at that portion opposed to the metallic ring.

* * * * *